Dec. 2, 1930.    J. L. MOHUN    1,783,300
LOCOMOTIVE STRUCTURE
Filed Aug. 27, 1927    5 Sheets-Sheet 1
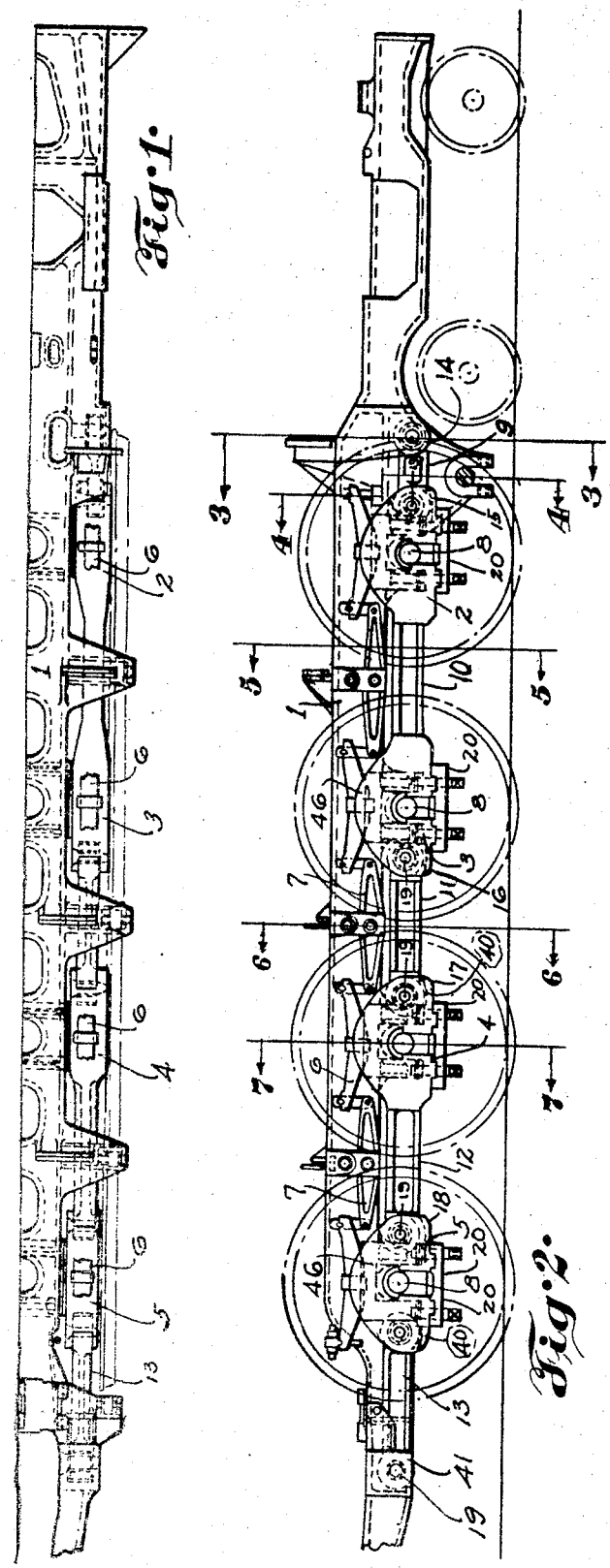
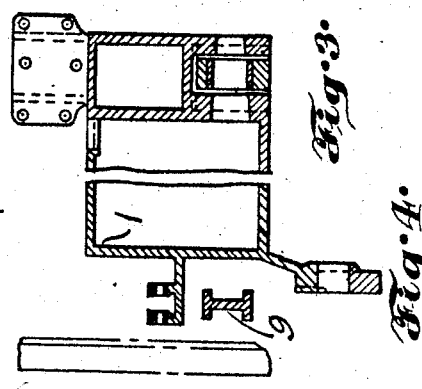
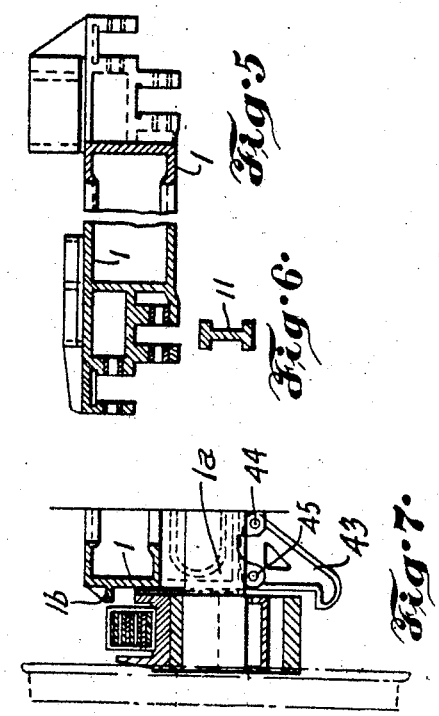
INVENTOR
John L. Mohun
By Cornwall, Bedell & James
ATTORNEYS Dec. 2, 1930.　　　　J. L. MOHUN　　　　1,783,300
LOCOMOTIVE STRUCTURE
Filed Aug. 27, 1927　　　5 Sheets-Sheet 2
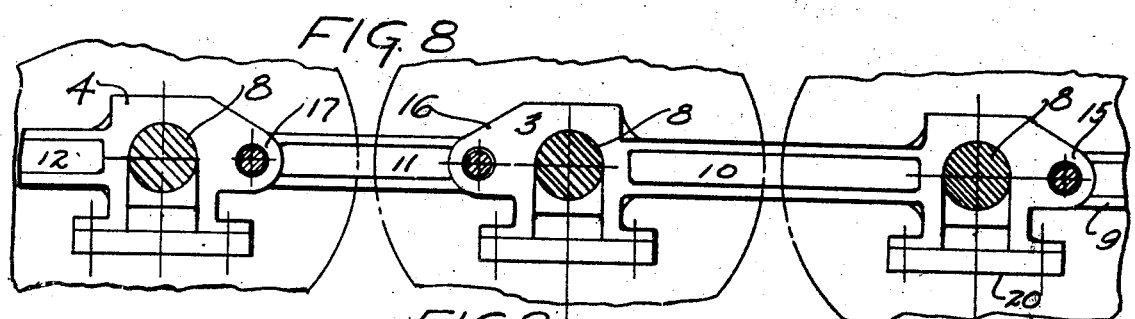
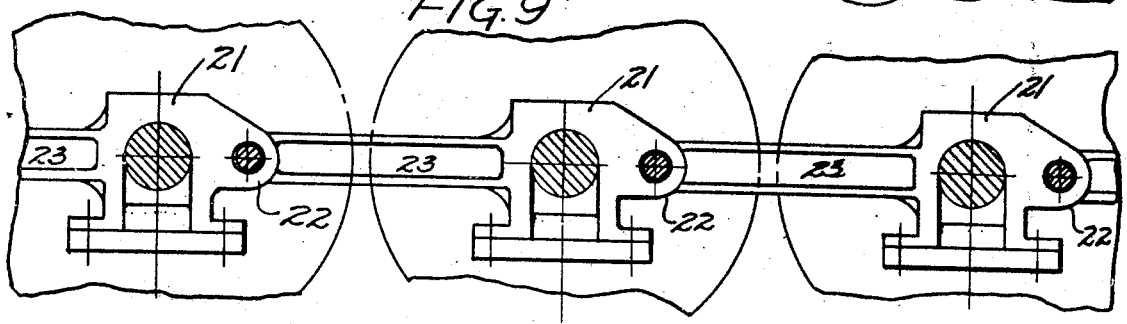
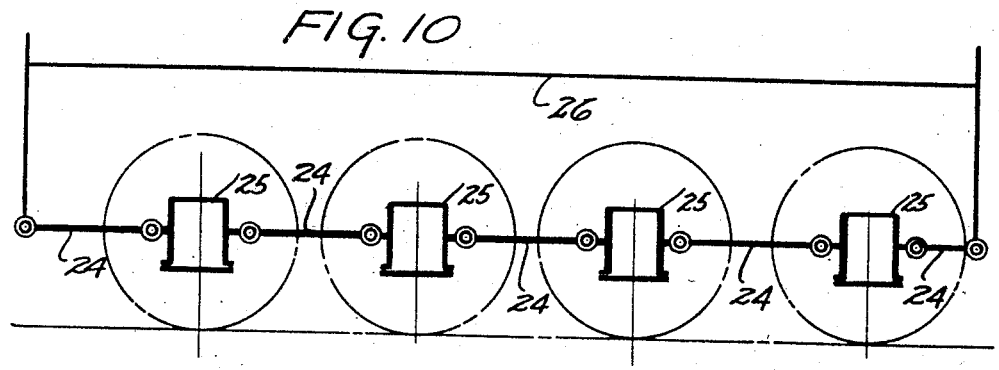
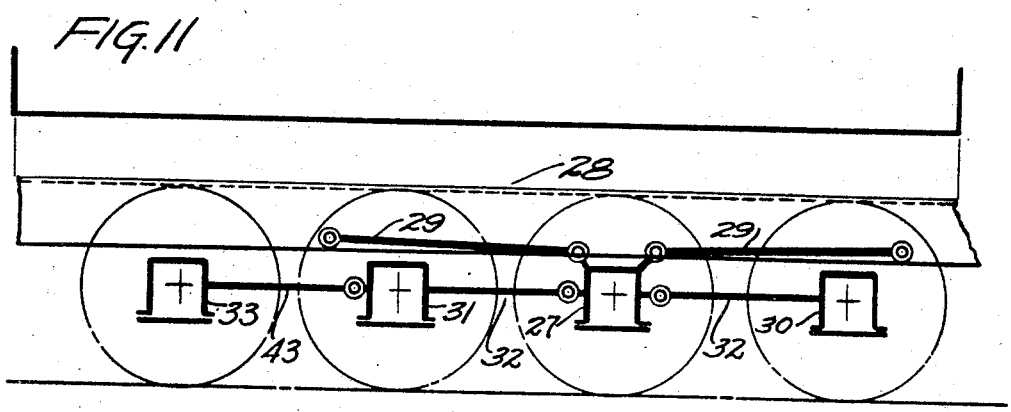
Inventor
John L. Mohun
By Cornwall, Cadell & Janus
Att'ys.

Dec. 2, 1930.  J. L. MOHUN  1,783,300
LOCOMOTIVE STRUCTURE
Filed Aug. 27, 1927   5 Sheets-Sheet 3
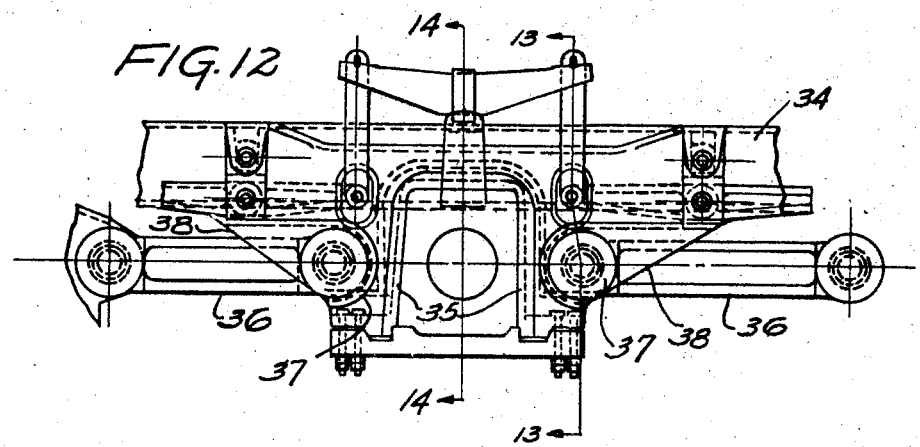
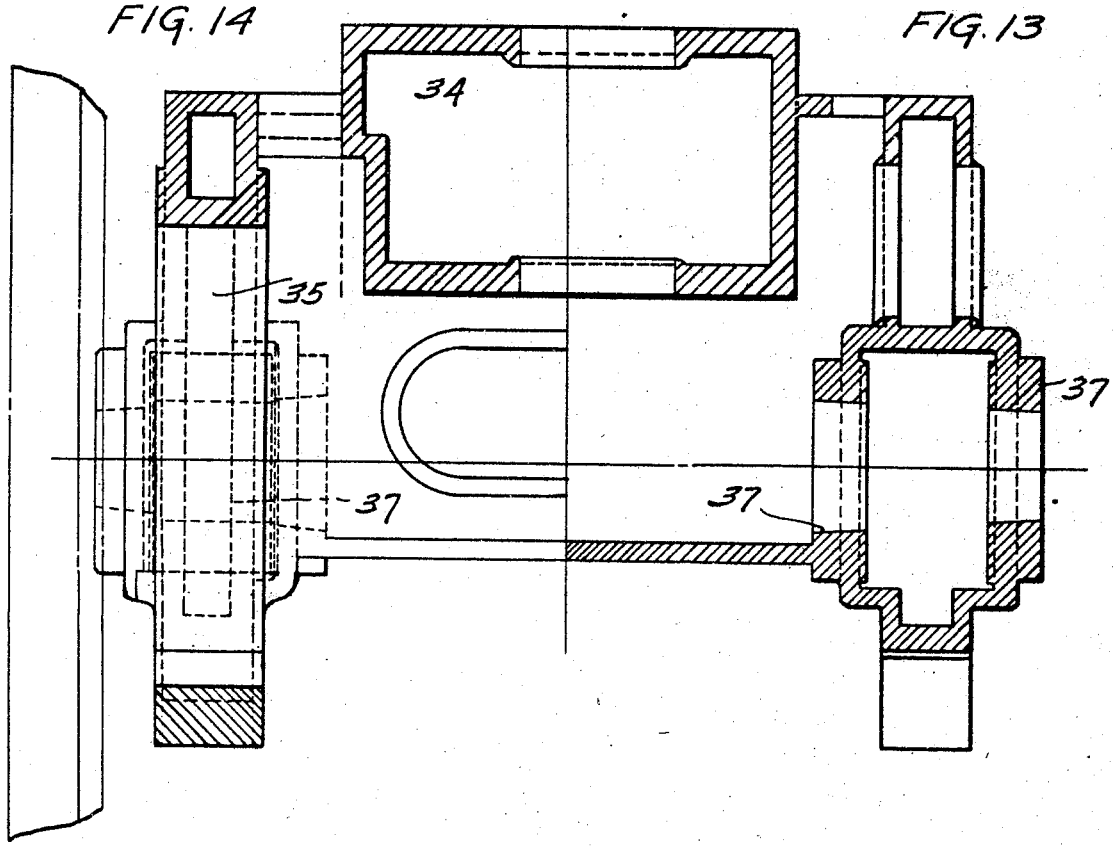
Inventor
John L. Mohun

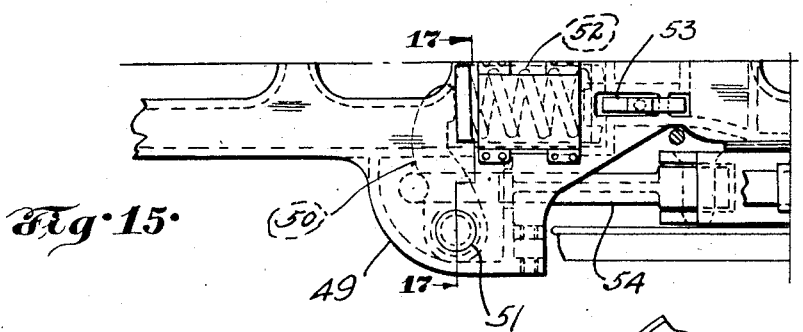
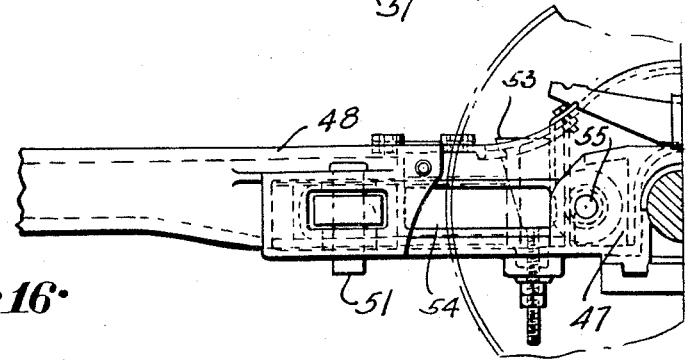
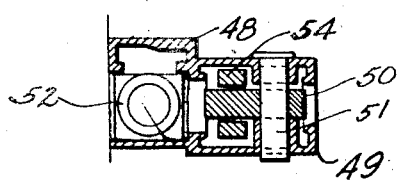
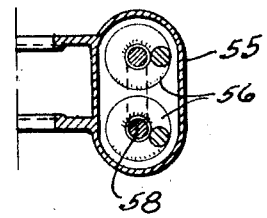
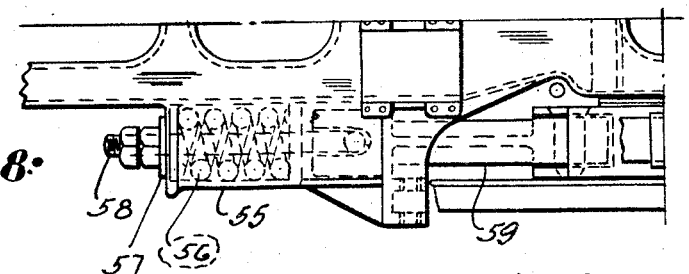
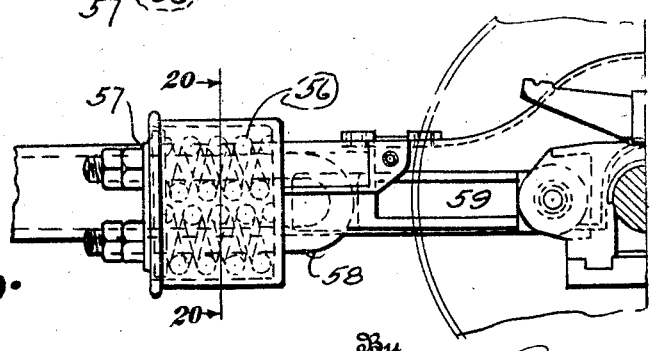

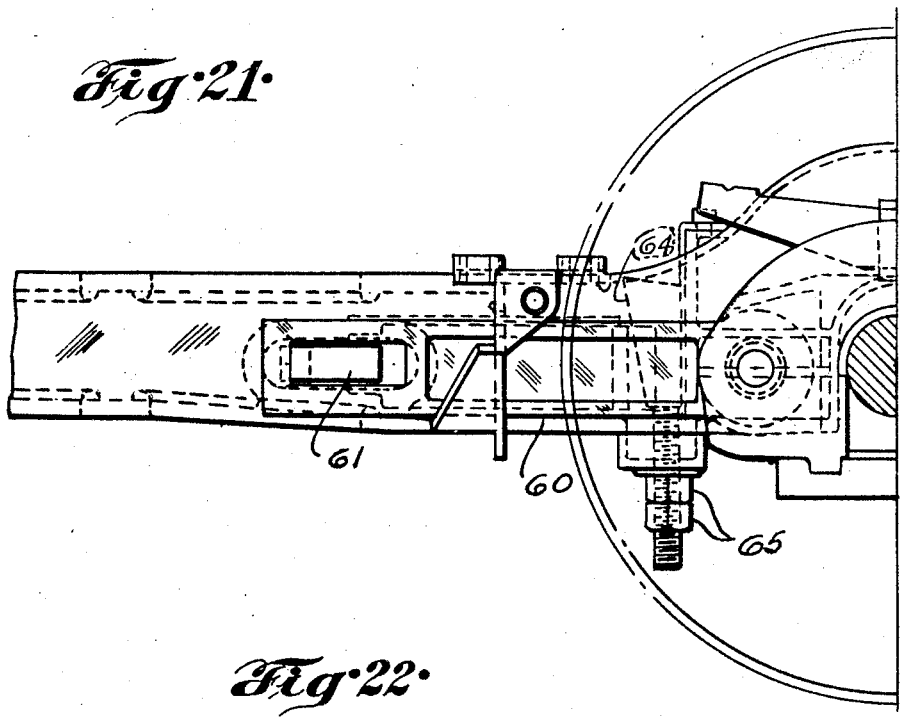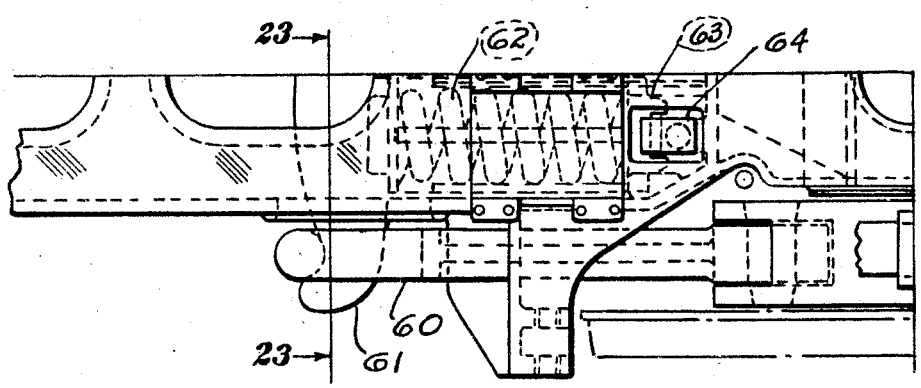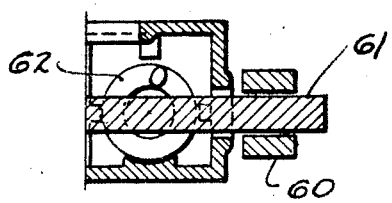

Patented Dec. 2, 1930

1,783,300

UNITED STATES PATENT OFFICE

JOHN L. MOHUN, OF OMAHA, NEBRASKA

LOCOMOTIVE STRUCTURE

Application filed August 27, 1927. Serial No. 215,831.

My invention relates to railway locomotives and consists in a novel main frame and running gear and their assembly with each other.

In the ordinary locomotive, excessive wearing of box bearings and wedges is constantly taking place because of the reciprocating piston thrusts, because of the vertical play of the boxes in the pedestals, because of the simultaneous piston thrusts in opposite directions on opposite sides of the frame during a portion of each piston stroke, and because of curving of the track and various inequalities in the rails. This necessitates repairs and replacements which are expensive in themselves and take the locomotive out of service. When the ordinary pedestal cap loosens, which is often the case, the frame is severely overstrained and as a result the frame and the associated parts are likely to fail. The present design of driving boxes and shoes and wedges in large locomotives is such that it is difficult to keep the crown brasses tight and "pounds" are developed which are passed directly to the frame and often result in broken frames, side rods, crank pins, etc. The disadvantages of such results are obvious.

The increase in locomotive tractive capacity taking place within the past twenty years has increased the failures resulting from the above-mentioned causes and has reduced the annual train miles per locomotive because large locomotives at the present time are out of service approximately two months out of the year due to the difficulty of maintaining the running gear in proper condition.

The general object of my invention is to eliminate the above disadvantages by transmitting the driving forces between adjacent driving boxes independently of the frame and transmitting all the driving force from one of the interconnected boxes to the frame.

A particular object is to insure that this latter transmission will always be in the nature of a pull and not in the nature of a thrust.

Other objects are to provide for different vertical movements of adjacent boxes without affecting their longitudinal spacing; to maintain the driving wheels more nearly in their correct relation to each other; and to provide an improved frame and box structure adapted to my novel running gear arrangement.

These and other more detailed objects of my invention are pointed out below and attained in the structure illustrated in the accompanying drawings, in which—

Figure 1 is a longitudinal one-half top view of the locomotive frame mounted on the running gear.

Figure 2 is a side elevation of the same. In these figures the frame is shown as provided with an integral cradle at its rear end and part of this cradle is cut away as indicated by the broken lines.

Figures 3, 4, 5, 6, and 7 are vertical transverse sections taken substantially on the lines 3—3, 4—4, 5—5, 6—6, and 7—7 of Figure 2. Figures 3, 5 and 6, as will be readily understood, being sections on the lefthand side of the frame.

Figure 8 is an enlarged detail of the connections between some of the boxes shown in Figure 2.

Figure 9 is a similar detail illustrating a modified form of my invention.

Figures 10 and 11 are diagrammatic illustrations of other forms of my invention.

Figure 12 is a fragmentary side elevation of another modified form of my invention.

Figures 13 and 14 are vertical transverse sections taken substantially on lines 13—13 and 14—14 of Figure 12.

Figures 15 and 16 are top and side views, respectively, of structure adjacent the rear driver and illustrating a modification of the connection between the running gear and the frame.

Figure 17 is a detail vertical section taken on line 17—17 of Figure 15.

Figures 18, 19, and 20 correspond to Figures 15, 16, and 17 and illustrate another modification.

Figures 21, 22, and 23 correspond to Figures 18, 19 and 20 and illustrate still another modification of my invention.

The locomotive frame indicated at 1 is what might be called a "backbone" type and is particularly characterized by not having any pedestals for the boxes of the driving axles. The frame is carried on the driving boxes 2, 3, 4, and 5 through a spring rigging, including springs 6 and equalizers 7 similar to the usual arrangement well known in the art. The driving boxes are mounted on the driving axles 8 in the usual manner but instead of transmitting the driving forces to pedestal jaws in the usual manner transmit these driving forces directly to each other through the medium of rods or link elements 10, 11, and 12 and these forces are transmitted to the frame through end links 9 or 13.

Adjacent to the front driver, the frame is provided with depending ears 14 which form bearings for a pivotal connection to one end of link 9, and the front side of driving box 2 is provided with ears 15 which form bearings for a similar connection to the opposite end of link 9. Link 10 is formed integrally with boxes 2 and 3 and rigidly connects the same. Opposing sides of boxes 3 and 4 are provided with ears 16 and 17, respectively, which form bearings for pivotal connections to link 11. Link 12 is formed integrally with the rear side of box 4 and is pivotally connected to the front side of box 5, the latter being provided with the ears 18 for this purpose. Link 13 is connected to ears 41 which are provided on the locomotive frame at the rear end thereof or on the forward portion of the cradle. Where the links, which transmit the driving forces, are pivoted to the boxes or frame I prefer to provide sufficient clearance between the pivot pins 19 and their bearings, either in the links or in the bearings, or both, and these clearances will permit the boxes to move vertically relative to each other without necessitating any relative longitudinal movement such as would otherwise result from the swinging of the connecting links.

Below the pivotal connection of each link to its corresponding journal box, I preferably provide on the lower portion of the journal box a web 40 which extends between the front and rear flanges of the box beneath the end of the link and will serve to support the link in the event of the breaking of its pivot pin.

In this arrangement, the driving forces are transmitted from the driving axles to the front and rear portions of the frame only, and between these portions of the frame the driving forces are transmitted directly between the boxes and in horizontal line with the driving axles. This construction eliminates the weight of the usual pedestal structure and the expense of machining pedestals and of assembling them with the frame, and also eliminates the usual box shoes, adjusting wedges, etc.

In the usual built-up construction, the loosening of a pedestal tie bar leaves the lower end of the pedestal legs without bracing between them and increases the possibility of the frame breaking because of the offset transmission of the driving forces. Each of my driving boxes is open at its lower side and is provided with a tie bar 20 which braces the sides of the box and forms a rigid construction not present in driving boxes now in general use. Furthermore, the overall dimensions of the box are not limited by the necessity of accommodating any predetermined pedestal structure or of meeting existing standards.

With the usual box construction the transverse lateral thrust of the driving wheels is transmitted from the box to the pedestals through the relatively small flanges provided on the sides of the box. With my improved arrangement such thrusts are transmitted by the body of the box as a substantial portion of the inner face of the box is backed up by the locomotive frame.

In the event of derailment or breakage of one of the connecting links or any other condition which would destroy the unitary assembly of the running gear, the drivers will be held against relative movement longitudinally of the frame because of the engagement of their axles with the depending portions $1^a$ on the frame. The driving boxes are held against abnormal vertical movement relative to the frame by means of lugs $1^b$, provided on the frame over the inner wall of each box, and by a bracket 43 pivoted at 44 to a lug on the depending portion $1^a$ of the frame and normally held in box engaging position by a pin 45 which may be removed to permit the bracket to tilt on pin 44 during assembly or disassembly of the box and frame.

Each of the boxes is reinforced transversely of the axle by the arcuate web 46 which extends between the ends of the connecting links of that box.

Generally speaking my running gear may be said to comprise three members, the locomotive frame and the two box assembly structures including the drivers, axles and bearings and the connections between the boxes and the frame. The longitudinal driving forces in any one of these three members are transmitted separately through the members in line with the centers of the driving axles. The rigid driving box construction provided assures that the crown brasses will be held tightly in place.

Preferably the frame is formed in a one-piece casting as shown and, if desired, the cylinders and cradle may be cast integrally therewith and also the necessary lugs and brackets for the boiler braces, equalizer fulcrums, brake hangers, valve gears, etc.

The weight of the material used is evenly distributed throughout the frame and the weight saved by the elimination of connections, etc., may be utilized by increasing the boiler and other parts of the locomotive structure which are limited by present frame and running gear design.

The particular arrangement of driving boxes and connecting rods shown in Figure 1 is illustrative only. Any combination of pivoted links and/or rigid links may be used. Figure 9 illustrates a modification in which each driving box 21 is provided with an integral link 23 extending outwardly from one side of the box and pivotally connected to the corresponding side of the adjacent box which is provided with suitable bearings 22 for this purpose.

In Figure 10 I illustrate an arrangement in which all of the links 24 are pivotally connected to the driving box 25 or to the frame 26.

It may be found desirable to anchor to the frame the main driving box which receives the direct thrust of the piston and connecting rod. Such an arrangement is illustrated in Figure 11 in which the main driving box is indicated at 27 and is pivotally anchored to the frame 28 by means of links 29, the adjacent boxes 30 and 31 being connected to box 27 by links 32 and rear box 33 being similarly connected to box 31 by link 43.

Still another form of my invention is illustrated in Figures 12, 13, and 14 in which the frame 34 is provided with pedestal jaws 35 between which the main driving box is seated in the usual manner. The adjacent driving boxes are connected to pedestal jaws 35 by links 36 and these boxes will be connected to any adjacent boxes as previously described. The pedestal jaws 35 differ from the usual pedestal construction in being provided with suitable bearings 37 for links 36 and in having extra reinforcing connection to the frame in the form of flanges 38.

In the construction shown in Figures 11 and 12, there is no direct connection between the end driving boxes and the frame.

In Figures 15, 16, and 17 I illustrate a modified connection between the driving box 47 and the locomotive frame or cradle 48. In this construction a projection 49 on the frame structure pivots a lever 50 by means of a pin 51, and the inner end of this lever is supported by a spring 52 which is seated against the adustable wedge 53. The rear link 54 is pivoted to the box at 55 and engages lever 50 between its fulcrum 51 and its spring supported end.

In the construction illustrated in Figures 18, 19, and 20 the frame forms a housing 55 for springs 56 and a spring follower plate 57 carries a U-bolt 58 which extends through the springs and to which the rear link 59 is connected.

In the forms illustrated in Figures 15 to 20, the yielding connection between the running gear on one side of the frame is independent of the running gear on the other side of the frame. Obviously friction elements could be added to the spring yielding means shown, and it is likely that standard draft gear assemblies could be applied to the locomotive at these points.

In the modification illustrated in Figures 21, 22 and 23, the link 60 attached to the rear driving box is connected at its rear end to a horizontally disposed lever 61 which extends transversely of the locomotive frame and is yieldingly forced rearwardly by one or more heavy springs 62 seated against suitable followers 63 in a pocket or housing formed in the main frame. A wedge 64, with its nuts 65, serve to adjust the spring tension. The lever 61 extends across the main frame and the spring 62 and other elements are duplicated on the opposite side of the center line of the locomotive. Hence, the lever 61 serves as an equalizer between the two running gears and any extra resistance to the driving forces on one side of the locomotive will be transmitted in part to the driving gear on the other side of the locomotive.

As shown in the forms illustrated in Figures 15 to 23, any well known form of resisting mechanism might be substituted for the springs 52, 56 and 62.

While I have illustrated and described my invention as applied to a steam locomotive, it will be understood that the field of my invention is not so limited but that the same could be used in an electric locomotive or on other driving truck structures.

Various modifications in the arrangement of the boxes and the connections between the same and the frame other than those illustrated might be made without departing from the spirit of my invention, and I contemplate the exclusive use of these and all other variations in the details of my invention as are included in the scope of my claims.

I claim:

1. In a locomotive, a pedestalless main frame, three or more driving boxes arranged longitudinally of the locomotive, means for transmitting longitudinal forces between all of said boxes independently of said frame, and means for transmitting longitudinal forces from said boxes to said frame.

2. In a locomotive, a pedestalless frame, two or more driving boxes arranged longitudinally of the locomotive, a member between two of said boxes for transmitting longitudinal forces directly from one box to the next, said member being pivotally connected to at least one of said boxes.

3. In a locomotive, a pedestalless frame, two or more driving boxes arranged longitudinally of the locomotive, a member between two of said boxes for transmitting longitudinal forces directly from one box to the next, said member being pivotally connected to both of said boxes.

4. In a locomotive, a pedestalless main frame, driving boxes and members pivotally connecting said frame and boxes and connecting said boxes to each other and transmitting driving forces between said frame and boxes.

5. In a locomotive, a pedestalless main frame, driving boxes and members pivotally and yieldingly connecting said frame and boxes and transmitting driving forces between said frame and boxes.

6. In a locomotive, a main frame, a series of driving boxes arranged longitudinally of said frame, pivotal connections between the sides of adjacent boxes, and pivotal connections between said frame and the end boxes of said series.

7. In a locomotive, a main frame, a series of driving boxes disposed longitudinally of the locomotive and articulated with each other, and articulated connections between the frame and the end boxes of said series.

8. In a locomotive, a pedestalless main frame, a series of driving boxes disposed longitudinally of the locomotive and articulated with each other, and an articulated connection between the frame and one of said boxes.

9. In a locomotive, a pedestalless main frame, driving boxes, driving-force transmitting elements between said boxes, and yieldingly driving-force transmitting elements between said frame and at least one of said boxes.

10. In a locomotive, a pedestalless main frame, a series of driving boxes arranged longitudinally of said frame, driving-force transmitting elements between said boxes, and driving-force transmitting elements between said frame and the end boxes of said series.

11. In a locomotive, a pedestalless main frame, a plurality of driving boxes arranged longitudinally of said frame, a spring and equalizer system supporting said bed on said boxes, and driving-force transmitting elements between and pivotally connected to said boxes and connected to said frame beyond the ends of said system.

12. In a locomotive, a pedestalless main frame, a plurality of driving boxes arranged longitudinally of said frame, means for supporting said frame on said boxes, and members pivoted to said boxes and transmitting driving forces between said boxes and from said boxes to said frame beyond the longitudinal zone of said means.

13. In a locomotive, a frame, a series of driving boxes arranged longitudinally of the locomotive, and a link pivotally connecting one of said boxes to the frame to transmit driving forces therebetween, there being play in the connection between said link and frame to permit relative vertical movement of said box or frame without affecting the longitudinal relation between the same.

14. In a locomotive, a main frame, a series of driving boxes arranged longitudinally of said frame, a link pivotally connecting one of said boxes to said frame to transmit driving forces therebetween, there being sufficient play in the link connections to permit relative vertical movement of said boxes and frame without affecting the longitudinal spacing of the same.

15. In a locomotive, a plurality of driving boxes arranged longitudinally of the locomotive, a link pivotally connecting one of said boxes to an adjacent box to transmit driving forces therebetween, there being play in the connection between said link and box to permit relative vertical movement of said boxes without affecting the longitudinal relation between the same, and yielding means for taking up play between said link and box.

16. In a locomotive, a frame, a series of driving boxes arranged longitudinally of said frame, a link pivotally connecting one of said boxes to said frame to transmit driving forces therebetween, there being sufficient play in the connection between said link and frame to permit relative vertical movement of said box and frame without affecting the longitudinal relation between the same.

17. In a locomotive, a frame, a series of driving boxes arranged longitudinally of said frame, links pivotally connecting said boxes to each other and to said frame to transmit driving forces therebetween, there being play in the connections between said links and said boxes and said frame to permit relative vertical movement of said boxes and frame without affecting the longitudinal relation between the same.

18. In a locomotive driving gear, a journal box, a link pivoted to said box and serving to transmit driving forces, and an element on said box for supporting said link independently of its pivotal connection to said box.

19. In a locomotive driving gear, a journal box, a link pivoted to said box and serving to transmit driving forces, and a flange on the lower portion of said box extending under the end of said link for supporting said link independently of its pivotal connection to said box.

20. In a locomotive driving gear, journal boxes having spaced vertical ears, a link between said ears, a pivot pin extending through said ears and link and a lateral flange between said ears below said link.

21. In a locomotive driving box, projections extending from opposite sides thereof and adapted to be connected to adjacent driving boxes, and a reinforcing web extending between said projections in an arch over the top of the box.

22. In a locomotive, a pedestalless main frame, running gear including a driver box located beyond the side of said frame, a spring supporting said frame on said box, and horizontal lateral projections on said frame for limiting relative vertical movement of said box and frame.

23. In a locomotive, a pedestalless main frame, running gear including a driver box located at the side of said frame, a spring supporting said frame on said box, a horizontal lateral projection on said frame for limiting relative vertical movement of said box in one direction, and a removable element on said frame for limiting movement of said box in the opposite direction.

24. In a locomotive, a pedestalless main frame, and a driving box located beyond the side of said frame, there being bearing elements on said box and frame for transmitting driving forces, said elements being aligned longitudinally of the locomotive.

25. In a locomotive, driver journals, a pedestalless main frame, driving boxes bearing transversely of the locomotive against the side of said frame adjacent to said journals, and means connecting the sides of said boxes, facing longitudinally of the locomotive, with said frame at points spaced from said boxes.

26. In a locomotive, driver journals, a pedestalless main frame, driving boxes bearing transversely of the locomotive against the side of said frame, adjacent to said journals, and driving-force transmitting members connecting said frame with the sides of said boxes facing longitudinally of the locomotive.

27. In a locomotive, a main frame, driving boxes arranged longitudinally of said frame, means connecting adjacent boxes to transmit driving stresses between said boxes independently of said frame, and means for transmitting lateral thrust from the boxes to said frame independently of said first-mentioned means.

28. In a locomotive, a pedestalless main frame, running gear including a driver box beyond the side of said frame, a spring supporting said frame on said box and a horizontal lateral projection on said frame for limiting relative vertical movement of said box in one direction.

29. In a locomotive, a main frame, a driver axle, a journal box therefor, said frame directly engaging with the face of said box and receiving transverse thrusts from the body of said box over said axle.

30. In a locomotive, a main frame, a driver axle, a journal box therefor, said frame directly engaging with and receiving transverse thrusts from that portion of the body of said box adjacent to the opening therein for said axle.

In testimony whereof I hereunto affix my signature this 18th day of August, 1927.

JOHN L. MOHUN.